(12) United States Patent
Reimers

(10) Patent No.: US 11,311,972 B2
(45) Date of Patent: Apr. 26, 2022

(54) CRACK STOPPER FOR WELDS

(71) Applicant: GKN Aerospace Sweden AB, Trollhättan (SE)

(72) Inventor: Robert Reimers, Trollhättan (SE)

(73) Assignee: GKN AEROSPACE SWEDEN AB, Trollhättan (SE)

( * ) Notice: Subject to any disclaimer, the term of this patent is extended or adjusted under 35 U.S.C. 154(b) by 537 days.

(21) Appl. No.: 15/520,870

(22) PCT Filed: Oct. 23, 2015

(86) PCT No.: PCT/EP2015/074661
§ 371 (c)(1),
(2) Date: Apr. 21, 2017

(87) PCT Pub. No.: WO2016/062883
PCT Pub. Date: Apr. 28, 2016

(65) Prior Publication Data
US 2017/0334025 A1 Nov. 23, 2017

(30) Foreign Application Priority Data
Oct. 24, 2014 (GB) ...................................... 1418987

(51) Int. Cl.
*B23K 31/02* (2006.01)
*F01D 25/28* (2006.01)
(Continued)

(52) U.S. Cl.
CPC ................ *B23K 31/02* (2013.01); *B23K 9/04* (2013.01); *B23K 9/042* (2013.01); *B23K 9/044* (2013.01);
(Continued)

(58) Field of Classification Search
CPC .......... B23K 31/02; B23K 9/04; B23K 31/12; B23K 26/34; F01D 25/28; B64C 1/12
(Continued)

(56) References Cited

U.S. PATENT DOCUMENTS 2,014,090 A * 9/1935 Schnetzer .......... B23K 11/0026
219/92
4,049,186 A * 9/1977 Hanneman ........... B23K 9/0216
228/225
(Continued)

FOREIGN PATENT DOCUMENTS

CN         1867418 A     11/2006
CN     102712063 A     10/2012
(Continued)

OTHER PUBLICATIONS

International Search Report and Written Opinion for PCT/EP2015/074661 dated Jan. 29, 2016 (9 pages).
(Continued)

*Primary Examiner* — Dana Ross
*Assistant Examiner* — Kuangyue Chen
(74) *Attorney, Agent, or Firm* — Bejin Bieneman PLC

(57) ABSTRACT

A method for joining two structural elements by welding, in particular by butt welding comprises forming a weld line joining the two structural elements; and adding material across the weld line, thereby forming one or more crack stoppers for limiting crack propagation along the weld line. The one or more crack stoppers each have a limited extension along the weld line as seen in relation to a length of the weld line. A structural system comprising two structural elements joined by the method is disclosed. The method may be applied, e.g., to components of aircraft engines.

15 Claims, 6 Drawing Sheets

(51) Int. Cl.
    *B23K 31/12*       (2006.01)
    *B23K 26/342*     (2014.01)
    *B23K 9/04*        (2006.01)
    *B64C 1/12*       (2006.01)
    *F02K 1/78*       (2006.01)
    *B23K 101/00*     (2006.01)
    *B23K 101/18*     (2006.01)
    *B23K 11/04*      (2006.01)
    *B23P 6/04*       (2006.01)

(52) U.S. Cl.
    CPC ............ *B23K 26/342* (2015.10); *B23K 31/12* (2013.01); *B64C 1/12* (2013.01); *F01D 25/28* (2013.01); *F02K 1/78* (2013.01); *B23K 11/04* (2013.01); *B23K 2101/006* (2018.08); *B23K 2101/18* (2018.08); *B23P 6/04* (2013.01); *F05D 2230/232* (2013.01); *F05D 2250/182* (2013.01); *F05D 2250/183* (2013.01); *Y02T 50/60* (2013.01)

(58) Field of Classification Search
    USPC .......................................... 219/121.6–121.86
    See application file for complete search history.

(56) References Cited

U.S. PATENT DOCUMENTS

| | | | |
|---|---|---|---|
| 4,585,917 A | 4/1986 | Yoshida et al. | |
| 6,336,583 B1* | 1/2002 | Wang | B23K 31/02 228/175 |
| 8,726,610 B2* | 5/2014 | Johnston | E04B 1/92 52/745.18 |
| 2009/0065556 A1* | 3/2009 | Finton | B23K 9/0286 228/262.1 |
| 2010/0215978 A1* | 8/2010 | Rice | F04D 29/284 428/577 |
| 2011/0297658 A1* | 12/2011 | Peters | B23K 9/02 219/162 |
| 2014/0192837 A1* | 7/2014 | Buchholz | G01N 3/32 374/47 |
| 2017/0179464 A1* | 6/2017 | Ein-Eli | H01M 10/0569 |
| 2017/0292401 A1* | 10/2017 | Sistaninia | G01M 15/048 |

FOREIGN PATENT DOCUMENTS

| | | |
|---|---|---|
| EP | 1287936 A1 | 3/2003 |
| EP | 1674187 A1 | 6/2006 |
| EP | 2390047 A1 | 11/2011 |
| JP | S5371647 B2 | 6/1978 |
| JP | S5373441 A | 6/1978 |
| JP | S574395 A | 1/1982 |
| JP | S6397802 A | 4/1988 |
| JP | 2001252702 A | 9/2001 |
| JP | 2005111513 A | 4/2005 |
| JP | 2005296986 A | 10/2005 |
| KR | 20140028506 A | 3/2014 |
| WO | 2012008056 A1 | 1/2012 |

OTHER PUBLICATIONS

Second Office Action from Japanese Patent Office for JP201580057745.4 dated Sep. 24, 2019 (19 pages; with English translation).
First Office Action from Japanese Patent Office for JP201580057745.4 dated Jan. 2, 2019 (5 pages; English translation).
JPO Office Action for Patent Application No. 2017-522056 drafted Oct. 29, 2019 (11 pages; with English translation).
UKIPO Combined Search and Examination Report for Application No. GB1418987.2 dated Jan. 9, 2015 (36 pages).

\* cited by examiner

CRACK STOPPER FOR WELDS

CROSS-REFERENCE TO RELATED APPLICATIONS

This application is a national stage of, and claims priority to, Patent Cooperation Treaty Application No. PCT/EP2015/074661, filed on Oct. 23, 2015, which claims priority to Great Britain Application No. GB 1418987.2 filed on Oct. 24, 2014, each of which applications are hereby incorporated herein by reference in their entireties.

BACKGROUND

Different parts of an aircraft, especially the various parts of the engine structure and components within the load path between the engine and the aircraft structure, e.g. the wings, are subject to large stresses during flight.

Engine components and components within the load path are often manufactured by casting parts thereof, or by using sheet metal or forging, and subsequently welding the different parts together. Any weld line connecting different structures might have an initial flaw, such as pores, originating from manufacturing. Such flaws may develop to a crack upon stress, particularly due to thermal and mechanical stresses occurring during flight. Hence weld lines are avoided in certain areas of an aircraft and an engine structure in order not to deliberately build into the structure crack initiation spots. Where weld lines are found acceptable, they are often dimensioned by damage tolerance standards, since crack propagation is a fatigue issue which is inevitably likely to occur due to the high and cyclic load types during flight. These loads often have a component which is perpendicular to the weld, acting to tear apart the structures joined by the weld. The damage tolerance, also referred to as critical crack length, is specified by strict criteria, depending on the specific location of the weld line. The crack should not be allowed to grow longer than that, so that safe flight and proper engine operation can be maintained. It is a design requirement that welds are designed with a damage tolerance life, which is larger than the component inspection interval. When estimating the damage tolerance life, a certain initial flaw size is assumed. Therefore, cracks should, as far as possible, be detected during regular inspections, where they can be repaired.

Typically each flight, at least within the commercial flight industry, will generate a main loading cycle and number of smaller loading cycles. These loading cycles give rise to two types of fatigue, low cycle fatigue (LCF) and high cycle fatigue (HCF), the later means more than 1 000 000 cycles within a short period of time. HCF is typically caused by vibrations, and by its nature there will be many vibration cycles during one single flight, typically one cycle per each revolution of the engine shaft. Therefore, if a crack would occur in an area exposed to HCF, HCF fatigue is likely to occur within just a few hours of flying. Crack growth due to HCF is therefore not possible to recognise during normal inspection intervals before failure occurs, due to the quick growth of a crack caused by HCF. Therefore, it is of importance to remove any possible risk for crack initiation in areas subject to HCF loading. This has generally been realised by using structural elements having a thickness larger than what would be required if only taking the material strength as such into account. Generally HCF fatigue is concentrated to specific areas of the engine structure and engine mount structure of an aircraft. Thus, only relatively limited, local areas of a specific engine structure will be exposed to HCF. Therefore, an approach as described above will lead to a global over-dimensioning of structures in order to overcome a local problem of HCF. Thereby, the structures may be relatively heavy. For certain types of applications, especially components made from expensive materials and/or components which are to be light-weight, this may contradict the purpose of the component. Also, the weight of the aircraft structures may influence e.g. fuel consumption and flight economy.

Therefore, while for pure LCF regions relatively thin structural elements can be used, structures comprising HCF regions are often relatively heavy. A problem is thus to be able to manufacture light-weight components also for regions exposed to HCF.

Cracks occurring and propagating due to LCF may be detected and repaired during the regular inspection and service intervals.

One example of a crack repair method is known from EP 1 674 187 A1, which describes arresting a brittle crack by removing material from the sides of a weld line and subsequently applying a repair weld to this region. This document, however, is related to repair of cracks along welds, and not to preventing crack propagation along weld lines.

SUMMARY

The present disclosure relates to preventing or limiting the propagation of cracks along welds. In particular, a method of welding and a weld formed by the method are disclosed. One particularly important application is in the field of aircrafts, especially jet engines and mounting structures for jet engines. Light weight structures can be fabricated also for components exposed to HCF during flight, propagation of cracks caused by LCF can be limited and/or prevented. In general, the present subject matter can be advantageously applied together with initial formation of weld lines.

According to an aspect of the present disclosure, a method for joining two structural elements by welding, in particular by butt welding, is disclosed. The method comprises the following steps:
forming a weld line joining the two structural elements;
adding material across the weld line, thereby forming one or more crack stoppers for limiting crack propagation along the weld line. The one or more crack stoppers each have a limited extension along the weld line as seen in relation to a length of the weld line.

Advantageously, but not exclusively, material is added on top of the weld line. For example, a bead or line of metal might be applied across the weld. A rib-like element may thereby be formed, extending across, and above, the weld line. If a crack is initiated in or adjacent to the weld line, propagation will generally take place along the weld line. In particular the transition area between the weld line and the surrounding structure is prone to crack propagation. When the crack propagates and eventually reaches the crack stopper, the crack stopper will limit the crack from propagating further. By limiting crack propagation the service interval for weld inspections might be extended. The crack stopper hence forms a stop, block or crack propagation barrier, such that a crack, if formed, may not continue propagation further along the weld line. The crack stopper may be formed either through addition of a continuous stream of material across the weld line or through addition of discontinuous spots of added material which become interconnected and together form a continuous crack stopper across the weld line.

One or more crack stoppers may be formed along the weld line, depending on e.g. the specific geometry, and the type of application and the loads that are likely to be exerted on the weld line and the surrounding structure. One crack stopper may be enough, when for example the component formed by the two structural elements has a constructional feature or other geometrical feature, such as connection to a third, obliquely oriented structural element which will also function to limit crack propagation. Crack propagation is thereby limited to the distance between the crack stopper and this constructional feature or other geometrical feature.

Since cracks are most likely to propagate along a weld line, especially along either side of a weld line in the transition between the weld line and the adjacent structure, the crack stoppers can span across the weld line such as to be attached to the structures on each side of the weld line.

According to an embodiment of the present disclosure, the method may comprise forming at least two crack stoppers at different positions along the weld line. A plurality of crack stoppers may be formed, where each crack stopper is positioned at a different position along the weld line. Crack propagation will thereby be limited by the distance between adjacent crack stoppers, such that a crack along the weld line does not grow longer than this distance.

The crack stopper extends across the weld line and to the structural elements on either side, or on each side, of the weld line.

As mentioned above, the crack stopper has a limited extension along the weld line. This means that the crack stopper only extends along a part of the weld line, preferably only along a fraction of the weld line. It is not the purpose of the method according to the present disclosure to form an additional weld or other extended feature on top of the weld line such as to cover a substantial portion of the weld line. Rather, the crack stopper may be understood as a discrete event along the weld line.

According to an embodiment, the extension of the crack stopper along the weld line may be of the same order of magnitude as the width of the weld line or the weld line plus the heat affected zone. When joining two structural elements by welding, not only the material of the weld line but also areas of the two structural elements adjacent the weld line will be affected by the heat involved in forming the weld line. The heat affected zone is thereby to be understood as the weld line plus the heat affected area on the structural elements on each side of the weld line.

According to an embodiment, when a plurality of crack stoppers are positioned along the weld line, the sum of the extension along the weld line for all crack stoppers comprise less than 25% of the length of the weld line. That is, if adding up the extensions of all crack stoppers, the total length will be less than 25% of the total length of the weld line across which they are positioned.

According to an embodiment, the crack stopper may span across the weld line such that the face of the crack stopper facing the structural elements and the weld line is substantially completely attached to the surface of the structural elements and the weld line.

The crack stopper may span across the weld line and to one or more features located on either or both of the two structural elements. That is, the crack stopper is not limited to extending only across the weld line, but may continue further such as to reach and eventually be in contact with structural features located on either side of the weld line. Such features could be for example bosses, connection elements, or any kind of element located on the structural elements. Further, the crack stopper might span over more than one weld line.

According to an embodiment, the crack stopper may be formed by metal deposition (MD). Metal deposition may be considered as a kind of additive manufacturing. It may also be referred to as build up welding. It comprises depositing metal by a weld process. Metal may be deposited by directing energy from an energy source, such as laser light, to a metal wire or powder, which is thereby melted onto the structure below. Metal may be deposited layer by layer, such as to build up a structure on top of the surface. During the process, the first layer fuses with the underlying surface and subsequent layers fuse with each other, such as to form a unitary component. Thereby, a crack stopper may be formed, spanning over the weld line.

According to an embodiment, the weld line and the crack stoppers may be formed of the same material.

According to an embodiment, the weld line and the crack stopper may be formed of the same material as the two structural elements.

According to an embodiment, the weld line and/or the crack stopper and/or the structural elements may comprise titanium (Ti) alloy.

According to an embodiment, the weld line and/or the crack stopper and/or the structural elements may comprise nickel (Ni) super-alloys. A specific type of such alloy is known under the name Inconel.

These types of alloys are used e.g. in air craft engines and components thereof, especially where weight should be minimized. The method according to this disclosure is especially useful in these kinds of applications, where weight and cost are critical factors.

According to an embodiment, the weld line and/or the crack stopper and/or the structural elements comprise aluminium (Al).

According to an embodiment, a plurality of crack stoppers may be formed along the weld line, such that neighbouring crack stoppers ($c_1, c_2, \ldots, c_n$) are spaced at predetermined distances ($d_{1,2}, d_{2,3}, \ldots, d_{n-1,n}$) from each other.

According to an embodiment, the crack stoppers may be regularly spaced.

According to an embodiment, the crack stoppers may be spaced such that the distances ($d_{i-1,i}$) between neighbouring crack stoppers ($c_1, \ldots, c_n$) are not all equal.

According to an embodiment, the crack stoppers may be irregularly spaced.

The spacing between adjacent crack stoppers may be controlled by a controller steering the formation of the crack stoppers. For example, in the case of metal deposition, the spacing may be controlled by the controller of the metal deposition apparatus. For practical reasons, the exact location of the crack stoppers may be determined by structural and/or geometrical limitations of the first and second structural elements. That is, the crack stoppers may simply be positioned where it is practical to position them. However, the intended function of limiting crack propagation can be taken into consideration.

According to an embodiment, the distances may be limited by a maximum allowable crack length along the weld line. That is, the distance between two adjacent crack stoppers may not be longer than the maximum allowable crack length. Preferably, the distance should be smaller, at least with a safety margin.

According to an embodiment, the maximum allowable crack length may be determined by at least one predetermined strength and/or functionality criteria.

Strength criteria, also referred to as structural criteria, may be related to preventing a crack to grow so long that it is no longer possible to arrest further growth of the crack. If a crack would grow too long, stresses applied to the weld line may cause the crack to propagate in an uncontrolled manner, for example such as to cause progressing or very rapid tearing of the material. If a crack grows so long, it may propagate also through the crack stopper. Therefore, adjacent crack stoppers should be arranged at a distance such that a crack may not propagate to a length where it becomes uncontrolled or structurally unsound. This critical crack length may be dependent on the amount of stress likely to occur in the area of the weld line. The critical crack length may thus depend on the specific engine component where the weld is located and the location of the weld line within or on this engine component.

Functionality criteria, or functional criteria, may relate to the consequences caused by the lack of integrity in the weld line or the structure caused by the crack. For example, a crack in a component supposed to be air tight will cause a lack of integrity of this component and thereby cause leakage during use. In such a case, the crack propagation could be limited such that leakage through the crack does not exceed a maximum allowed leakage.

Further, the strength of the crack stopper, that is, its ability to prevent crack propagation across it, may be influenced by, e.g., its geometry and/or under which parameters it was formed.

According to an embodiment, a thickness and/or size of the crack stopper may be determined by predetermined strength and/or functionality criteria. These criteria may be criteria as described above. The thickness is to be understood as the height of the crack stopper in a direction normal, or perpendicular, to the surface of the weld and/or the structural elements. The size may be understood as the two-dimensional area covered by the crack stopper, that is, the area of attachment of the crack stopper to the underlying weld line and structural elements.

The strength of the crack stopper may preferably be chosen taken into account the distance between adjacent crack stoppers, in order to be able to stop a crack from growing larger than the distance between adjacent crack stoppers. The strength of the crack stopper may be adapted by selecting the size of the crack stopper. Dimensions which may be varied are the surface area covered by the crack stopper, such as the length and the width thereof, and the height or thickness of the crack stopper, which is a dimension of the crack stopper in a direction substantially normal to the weld line surface.

According to an embodiment, the weld line may be allowed to cool in relation to a temperature obtained during the forming of the weld line before forming the crack stopper. The crack stopper may be formed as soon as the weld line has cooled to a certain temperature. The crack stopper may also be formed on already existing weld lines. Especially, components on the shelf, which comprise weld lines, may be equipped with crack stoppers.

Prior to or substantially simultaneous with the formation of the crack stopper, the surface area where it is intended to be formed may be deliberately heated such as to promote fusion of the crack stopper with this surface.

According to an embodiment, the steps of forming a weld line and forming a crack stopper may be performed using the same method.

According to an embodiment, the steps of forming a weld line may be performed by laser welding and/or said step of adding material may be performed using a laser. That is, both the steps of forming the weld line and of forming a crack stopper may be performed by laser welding. Especially, both steps may be performed by using metal deposition as described above. Alternatively, only one of the steps may be formed by laser welding. For example, the weld line may be formed using another form of welding, and subsequently the crack stopper may be formed by laser welding, for example by metal deposition as described above. Alternatively, the weld line and/or the crack stopper may be formed by tungsten-inert-gas welding (TIG). The weld line may be formed by other welding methods, such as liner friction welding.

According to an embodiment, the crack stopper may have an elongated shape, extending in a direction of a main axis, such as substantially rectangular, elliptical or oval.

According to an embodiment, the crack stopper may thereby have an elongated shape, such as substantially rectangular, elliptical or oval, with their main axis being oriented perpendicularly to the weld line According to an embodiment, the crack stopper may have an elongated shape, such as substantially rectangular, elliptical or oval, with their main axis being oriented at an oblique angle to the weld line.

According to an embodiment, the crack stopper may have an elongated shape, such as substantially rectangular, elliptical or oval, with their main axis extending along the weld line.

When pluralities of crack stoppers having an elongated shape are positioned along a weld line, it is not necessary that they are all oriented in the same way with respect to the weld line. The orientation of the main axis with respect to the weld line may be determined by the local geometrical and/or constructional situation at or in the vicinity of the position of the crack stopper. That is, the orientation of the crack stopper may be determined by what is possible to obtain at the location of the crack stopper.

Thus, different crack stoppers may be arranged with different angle to the weld line, for example depending on the geometry and structural limitations at the position of the crack stopper.

According to an embodiment, the crack stopper may have substantially circular shape.

According to an embodiment, the crack stopper may have substantially polygonal shape.

Alternatively or additionally the crack preventing weld line may be in the form of a continuous weld alternating between either side of the weld line joining the two structural elements. For example a zig-zag weld may be overlaid over the joining weld to form a continuous crack-stopping weld. In another arrangement a continuous step-shaped weld pattern may be used in which portions of the crack-preventing weld are perpendicular to the joining weld and portions of the crack-preventing welds are parallel to the joining weld. See for example FIG. 6.

Advantageously the crack-preventing weld may in the form of a plurality of discrete welds each extending across a primary weld (that is the weld joining two structural elements together) wherein the plurality of crack-preventing welds are arranged so as to be substantially perpendicular to the primary weld.

All crack stoppers along a weld line may have similar shape. However, it is not necessary that all crack stoppers along a weld line have similar shape. For example, the shape may differ due to geometrical or other constructional restrictions at the location of the crack stopper.

According to an embodiment, the crack stopper may have a height in a direction normal to the weld line. The height may be within the range of 0.5 to 10 times the thickness of the structural elements. The height may be within a range of 0.5 to 5, or even within a range of 0.5 to 3 times the thickness of the structural elements. The crack stopper may thus have a height of the same order of magnitude as the thickness of the structural elements.

According to a second aspect of the present disclosure, a method for strengthening a weld line joining two structural elements is disclosed. The method comprises the step of— adding material across the weld line, thereby forming one or more crack stoppers for limiting crack propagation along the weld line. The one or more crack stoppers each have a limited extension along the weld line as seen in relation to a length of the weld line. Thereby, crack stoppers may be added to existing weld lines. Thus, already existing components or structural systems comprising structural elements joined by weld lines may be provided with crack stoppers.

According to a third aspect of the present disclosure, a structural system comprising two structural elements is disclosed. The two structural elements are joined by a method as described above. The weld line may however be used to join a plurality of structural elements.

According to an embodiment, a jet engine or component thereof, such as a fan case, a fan structure, a compressor structure, turbine structure or an engine mount structure, comprising such a structural system is disclosed. According to an embodiment, an aircraft comprising such a structural system is disclosed.

One or more of the embodiments discussed above can be combined with each other and with the different aspects of the disclosure.

BRIEF DESCRIPTION OF THE DRAWINGS

The present disclosure will hereinafter be further explained by means of non-limiting examples with reference to the appended figures where.

DETAILED DESCRIPTION

Figure 1:
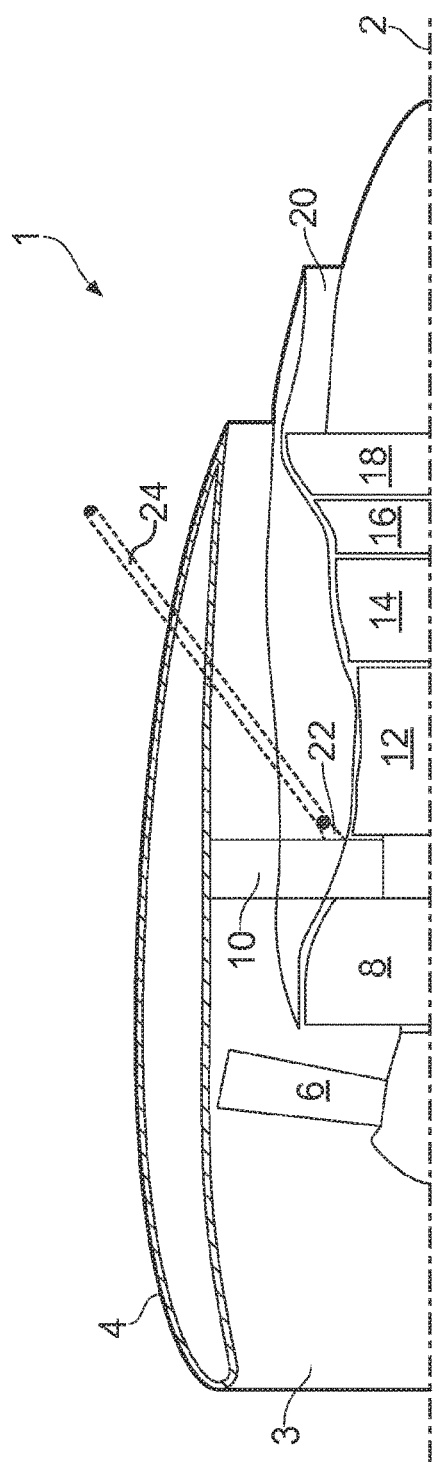
FIG. 1 schematically shows an aircraft engine in cross section.

An aircraft engine 1 is shown schematically in FIG. 1. The aircraft engine extends around a central axis 2.

The main parts of the aircraft engine 1 are a fan case 4 surrounding a fan 6, a low pressure compressor 8, a compressor structure 10, a high pressure compressor 12, a combustor 14, a high pressure turbine 16, a low pressure turbine 18 and a turbine structure 20, arranged in this order along the axis 2.

The compression section, comprising the low pressure compressor 8 followed by the high pressure compressor 12, compresses at least a part of the air entering the engine through the inlet 3 before it is made to enter the combustor 14. A part of the air entering via the inlet may be led through a by-pass flow path (not shown) such as to generate forward thrust. In the combustion section the combustion takes place, by ignition and burning of a mixture of air and fuel. The combustion products are made to expand through the turbine section comprising the high pressure turbine 16 and the low pressure turbine 18, thereby making the turbines rotate around the axis 2. The high pressure turbine 16 and the high pressure compressor 12 are mounted on a common shaft (not shown), such that the high pressure turbine drives the rotation of the high pressure compressor. The high pressure turbine 16 is followed by the low pressure turbine 18, which is mounted on a shaft common with the low pressure compressor 8 and the fan 6, such that the low pressure turbine 18 makes the fan 6 and the low pressure compressor 8 rotate. Both shafts are concentric and rotate around the engine central axis 2.

The compressor structure 10 is a structure located between the low pressure compressor 8 and the high pressure compressor 12. It is a static component within the load path transmitting thrust from the engine to the aircraft body, thereby driving the aircraft forward. The specific construction and design of the compressor structure depends, as mentioned above, on the specific engine construction, and are known under various terminology. Different manufacturers use different terminology and have different architectural constructions. The terms intermediate compressor case (ICC), intermediate case (IMC), and fan hub frame (FHF) all refer to constructions located between the low pressure compression section and the high pressure compression section. The crack stopper technique described herein may be applied to weld lines comprised in any of the above listed engine structures.

As indicated in FIG. 1, the compressor structure 10 comprises thrust lugs 22 or similar elements, allowing mounting the engine to a pylon via thrust links 24. The pylon is, in turn, connected to the wing of the aircraft. The thrust driving the air craft forward is transmitted from the engine to the air craft body via this structure. Part of an engine structure, in the vicinity of an engine mount or thrust lug, may be considered as a primary structure element (PSE), hence thereby dimensioned by crack propagation also in regions without any welds. The crack stopper technique described herein may be applied to any structural element considered as primary structure element (PSE) comprised in any of the above listed engine structures. Especially, the crack stopper technique may be applied to weld lines comprised in the PSE. It may also be applied at other locations of the air frame structures, such as the nacelle and pylons.

Figure 2:
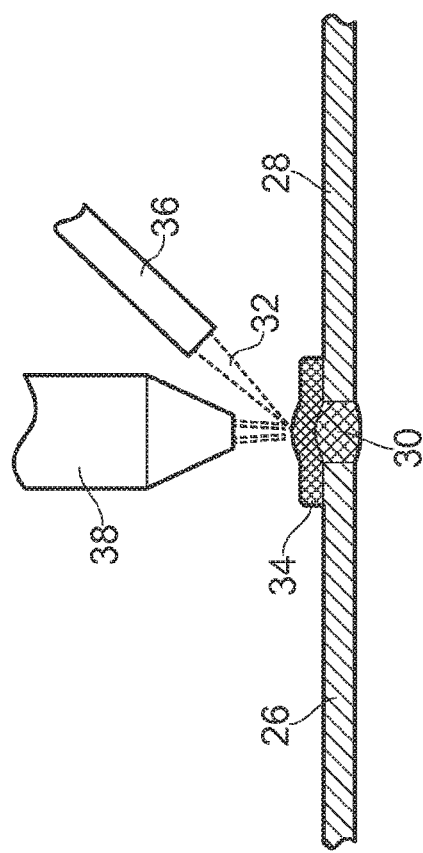
FIG. 2 schematically shows the formation of a crack stopper.

A method of joining two structural elements, here illustrated by a first component 26 and a second component 28, by welding according to some embodiments of the present disclosure is illustrated schematically in FIG. 2. The method comprises two main steps. In the first main step a weld line 30 is formed joining the first component 26 and the second component 28. This weld line 30 can be formed by various, known methods of welding. In the second step, which is illustrated in FIG. 2, material 32 is added across the weld line 30, thereby forming a crack stopper 34 for limiting crack propagation along the weld line 30. The crack stopper 34 spans from the first component 26, over the weld line 30, to the second component 28. The crack stopper 34 has a limited extension along the weld line 30 as seen in relation to a length of the weld line. It is thereby not the purpose to cover the length of the weld line 30 with additional material 32, but to form discrete features in the form of one or more crack stoppers 34 along the weld line 30. The extension of the crack stopper may be of the same order of magnitude as the width of the weld line or the heat effected zone, as described above.

In the embodiment of the method illustrated in FIG. 2, the crack stopper 34 is formed by a method known as metal deposition (MD). In this method, weld material 32 may be in the form of a wire, which is fed by a wire feeder 36, and is melted by an energy source, here in the form of laser light 38, on top of the existing weld line 30. Thereby, a crack stopper 34 extending from the first component 26, across the weld line 30, to the second component 28 is formed. Alternatively, the material 32 may be provided in the form of powder distributed by a powder source. The powder may be circulated in the air above the weld line using a blower, and melted onto the underlying surface using e.g. laser light 38.

During the MD process, the surface, on top of which the crack stopper 34 is to be formed, may be heated in order to achieve a good homogenisation between the deposited metal and the surfaces of the first and second component 26, 28 and the weld line 30. Thereby, the crack stopper may be substantially completely attached to the underlying surface. The process of melting additional material 32 is continued until a crack stopper 34 having a certain size is obtained.

The wire feeder 36 and the laser light source 38 may be moved relative to the weld line 30, such as to form a plurality of crack stoppers 34 along the weld line.

The steps of forming a weld line and forming a crack stopper may be performed using the same method. For example, both steps may be performed using the metal deposition method described with reference to FIG. 2. Thereby, two different welding apparatuses may be used, or both steps may be performed using the same apparatus. The weld line 30 and the crack stopper 34 may be formed of the same material. Even more, it may be possible to form the weld line 30 and the crack stoppers 34 from the same material as the two structural elements. Within the type of applications described herein, common materials are titanium (Ti) alloy, nickel (Ni) superalloys, and aluminium (Al).

The weld line may be allowed to cool in relation to a temperature obtained during the forming of the weld line before forming the crack stoppers. The first and the second steps may thereby be performed substantially subsequent to each other. However, it is also possible to add crack stoppers 34 by the method illustrated in FIG. 2 on already existing weld lines.

Figure 3A:
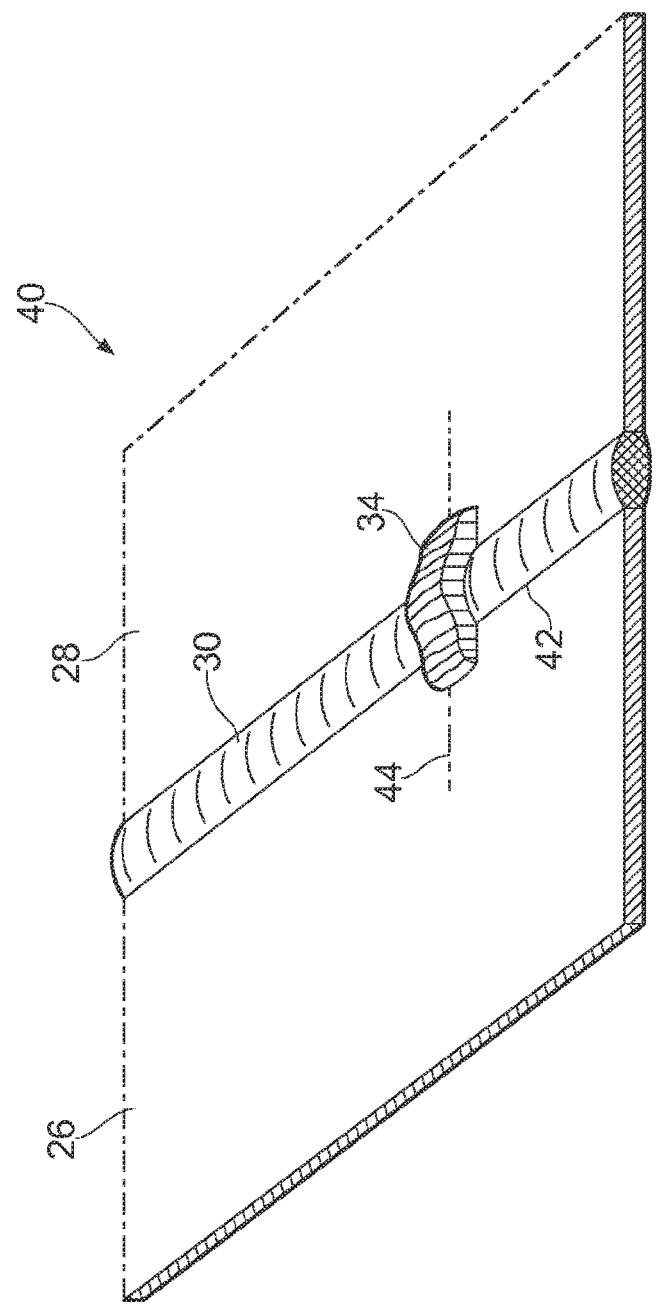
FIG. 3A schematically shows a weld line comprising a crack stopper.
Figure 3B:
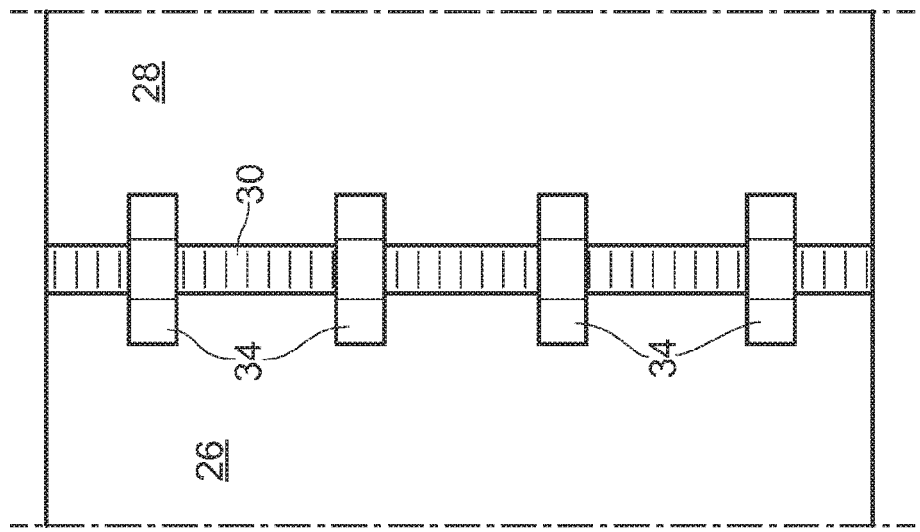
FIG. 3B shows a weld line comprising a plurality of irregularly spaced crack stoppers.
Figure 3C:
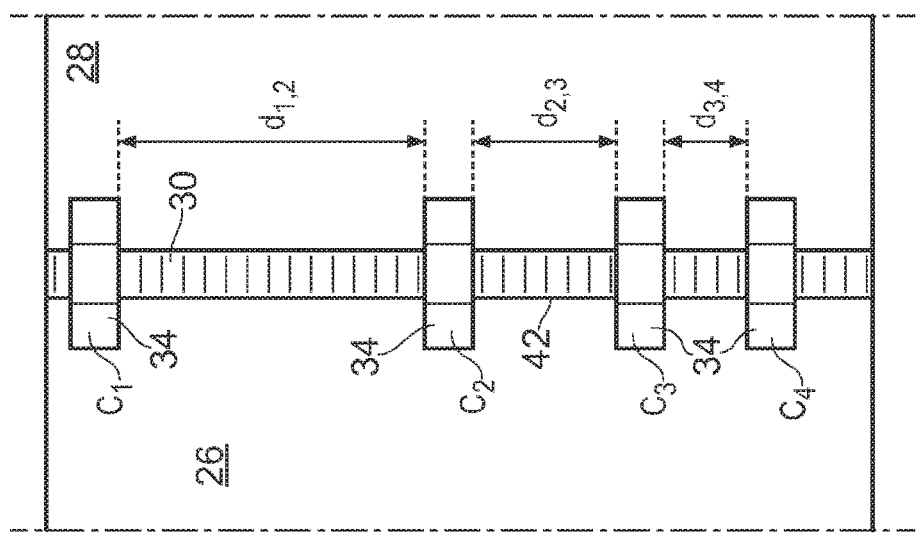
FIG. 3C shows a weld line comprising a plurality of regularly spaced crack stoppers, FIG. 4 schematically illustrates a compressor structure provided with crack stoppers, FIG. 5 schematically illustrates a detail of a compressor structure provided with crack stoppers, and FIG. 6 schematically illustrates two alternative crack-preventing weld patterns.

FIG. 3A to 3C schematically illustrate structural systems 40 comprising two structural elements which have been joined by a method as described with reference to FIG. 2. Each system 40 comprises a first component 26 and a second component 28, which are joined by a weld line 30, and one or more crack stoppers 34 arranged across the weld line 30. The purpose of the crack stopper 34 is to limit the growth of a crack 42 propagating along the weld line 30.

FIG. 3A illustrates a system 40 comprising one crack stopper 34, limiting propagation of the crack 42 along the weld line 30. The crack 42 indicated in FIG. 3A may be limited in the other direction by a further geometrical feature (not shown) present in a component comprising the structural system 40.

FIGS. 3B and 3C illustrate systems 40 where a plurality of crack stoppers 34 has been formed at different positions along the weld line 30. Thereby, a plurality of crack stoppers 34 may be arranged along the weld line 30, such that neighbouring crack stoppers ($c_1$, $c_2$, ..., $c_n$) are spaced at predetermined distances ($d_{1,2}$, $d_{2,3}$, ..., $d_{n-1,n}$) from each other. The crack stoppers 34 may thereby be arranged regularly or irregularly spaced. FIGS. 3B and 3C schematically illustrate this principle.

FIG. 3B illustrates an embodiment where the distances ($d_{i-1,i}$) between neighbouring crack stoppers ($c_1$, ..., $c_n$) are not all equal. In FIG. 3B, the distances between the crack stoppers 34 are irregular. The specific location of the different crack stoppers 34 may be determined by e.g. manufacturing possibilities, such as by locations where no other features are present in the direct vicinity of the weld line 30, such that it is easy to perform e.g. metal deposition across the weld line 30. In FIG. 3B, the propagation of the crack 42 is limited by the crack stoppers 34 denoted $c_2$ and $c_3$. Thereby, the crack 42 cannot grow longer than the distance $d_{2,3}$.

FIG. 3C illustrates an embodiment with regularly spaced crack stoppers 34. In FIG. 3C, all crack stoppers 34 are positioned at equal distances from each other.

As can be seen in FIG. 3A to 3C, each crack stopper 34 has a limited extension along the weld line 30. The extension of the crack stopper 34 may be of the same order of magnitude as the width of the weld line 30, or of the heat affected zone extending over the weld line 30 and adjacent areas of the first and second components 26, 28. The crack stoppers 34 may thereby be seen as singular, discrete features along the weld line 30. If a plurality of crack stoppers 34 are positioned along the weld line 30, the sum of the extension of each crack stopper 34 may comprise less than 25% of the length of the weld line 30.

In FIG. 3A to 3C, the crack stoppers 34 may span across the weld line 30, and extend onto the first and second components 26, 28. The crack stoppers 34 are dimensioned such as to provide a mechanical strength which is high enough to prevent crack propagation. Additionally, if due to the geometry and/or structural construction of one or both of the first and second components 26, 28 additional strengthening would be advantageous, for example due to features (not shown) arranged on the first and/or second components 26, 28, the crack stopper may be arranged such as to extend further onto the first and/or second component 26, 28, eventually onto these features.

Independent of whether the crack stoppers 34 are arranged at regular distances or not, the distance between adjacent crack stoppers 34 should preferably not be larger than a predetermined maximum allowable crack length along the specific weld line, as this distance limits the crack propagation. The maximum allowable crack length is determined by at least one predetermined strength and/or functionality criteria, as described above.

Also the dimensions of the crack stopper 34 may be determined by the predetermined strength and/or functionality criteria. Especially, a thickness and/or size of the crack stoppers 34 may be determined by the predetermined strength and/or functionality criteria. The thickness can also be referred to as the height of the crack stopper 34 over the surface on which it is formed, that is, over the first and second components 26, 28. The height of the crack stopper 34 may typically of the same order of magnitude as the thickness of the first and second components 26, 28. Thus, the height of the crack stopper 34 may be approximately equal to the thickness of the structural elements, or it may be a few multiples of the thickness of the structural elements. The size of the crack stopper 34 is related to the area of its attachment to the first 26 and second 28 component and the weld line 30. Ideally, the crack stopper 34 is completely attached to the underlying surface 26, 28, 30.

Strength criteria are related to preventing sudden, rapid crack propagation, or burst. Crack stoppers 34 should preferably be positioned within such distances from each other that they can prevent a rapid, uncontrolled growth of a crack 42 propagating along the weld line 30.

Functionality criteria are criteria relating to maintaining the function of the component on which the crack stoppers 34 are provided in spite of the crack 42. Thereby, cracks 42 should not be allowed to grow longer than that so an acceptable functioning of the component is maintained. For example, if the crack stoppers 34 are positioned on an engine component, air leakage through the crack 42 should be limited such that the functionality of the engine is maintained.

Although, for illustration, in FIG. 3A-3C the crack stoppers 34 are illustrated as having substantially rectangular shape with their main axis extending substantially perpendicular to the weld line 30, the crack stoppers 34 may have basically any shape. The shape can be determined e.g. by ease of manufacturing, for example by geometrical restrictions in the area where it is to be positioned.

For example, the crack stoppers 34 may have an elongated shape, extending in a direction of a main axis 44, such as substantially rectangular, elliptical or oval. The crack stoppers 34 may be oriented with their main axis 44 oriented in any direction to the weld line 30. For example, the main axis 44 may be oriented perpendicularly to the weld line 30, as shown in FIG. 3A. Further, the main axis 44 may be oriented at an oblique angle to the weld line, or the crack stoppers 34 may be oriented with their main axis 44 extending along the weld line 30, as illustrated by crack stopper 70 in FIG. 5.

Other possible shapes of crack stoppers 34 are circular or polygonal shape.

Even more, it is not necessary that all crack stoppers 34 along a weld line 30 have similar shape, but the shape may be determined by local requirements, and/or local geometrical and/or constructional restrictions.

As mentioned above, the method disclosed herein has a wide area of applications. For example, the method may be applied to jet engines or components thereof, such as a fan case, a fan structure, a compressor structure, turbine structure or an engine mount structure. The method of welding presented herein is particularly suitable for being used on compressor structures and on engine mount support structures (EMSS), such as engine mount attachment lugs or similar structures on the engine casing as well as portions of the engine structures which are critical to the engine mount load path. These structures may be known under different terminology depending on the specific engine construction and the engine manufacturer. In examples described below, as a general terminology we refer to such structures as engine compressor structures. Such structures are referred to using different terminology. For example, it may be referred to as primary structural element (PSE), intermediate compressor case (ICC), intermediate case (IMC), and fan hub frame (FHF), all referring to constructions located between the low pressure compression section and the high pressure compression section, mounting the engine to a pylon, which in turn is mounted to the wing of the aircraft. These structures are the direct primary load path transmitting the engine thrust force to the aircraft structure, through the pylon and the wing. The crack stopper technique may be applied to welds comprised in any of the above listed engine mount support structures. In this area, a critical crack length is a length that can just support limit loads.

Another example where the method described herein is particularly useful are bleed bosses that are exposed to vibration, and stress across the welds joining the bleed boss to the outer case. These cracks, which grow due to HCF loading, may grow beyond critical crack lengths within a few hours of flying, if not stopped. Thereby, it is normally impossible to detect emerging cracks during the regular inspections. In this case, by the presence of crack stoppers across the weld lines, the crack can be stopped early enough to prevent dysfunction during flight.

Figure 4:
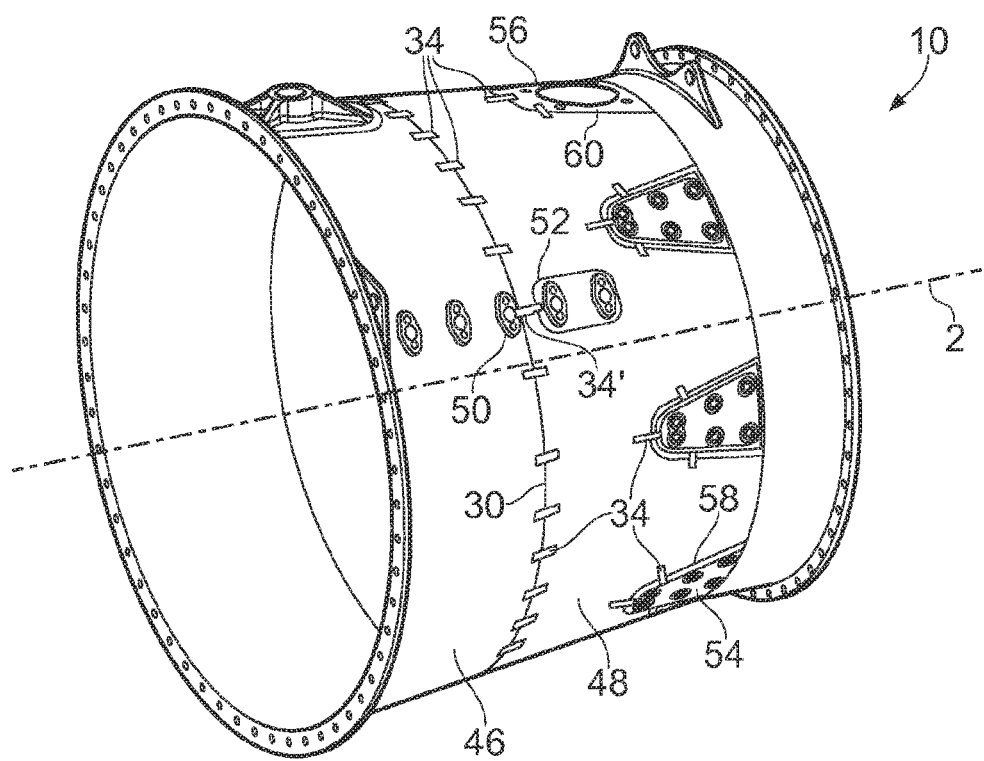

FIG. 4 shows a compressor structure 10 according to any of the types described above with reference to FIG. 1. The compressor structure 10 is provided with a plurality of crack stoppers 34 formed by the method described above. The compressor structure 10 comprises a first component 46 and a second component 48 joined by a weld line 30. A plurality of crack stoppers 34 are arranged along this weld line 30. As can be seen in FIG. 4, one of the crack stoppers 34, indicated as crack stopper 34', extends over the weld line 30 and onto further features 50, 52 located on the first 46 and second 48 components, respectively. The compressor structure 10 shown in FIG. 4 further comprises bosses 54, 56 welded onto the compressor structure 10 by weld lines 58, 60. Crack stoppers 34 are provided over these weld lines 58, 60.

Figure 5:
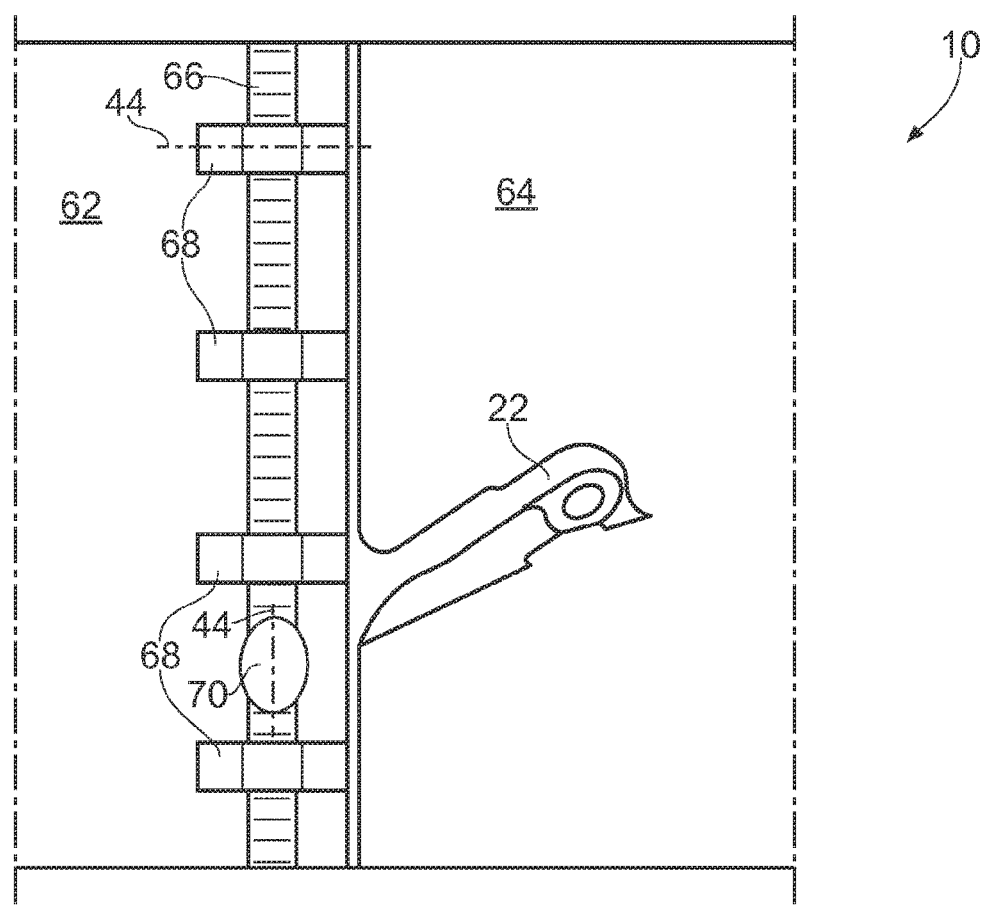
Figure 6:
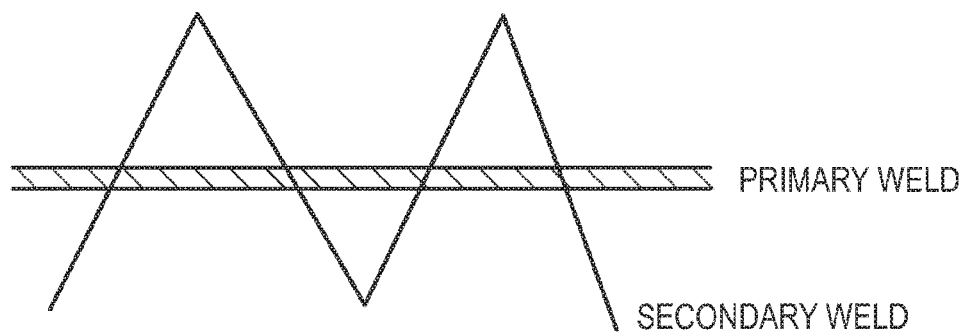
Figure 6:
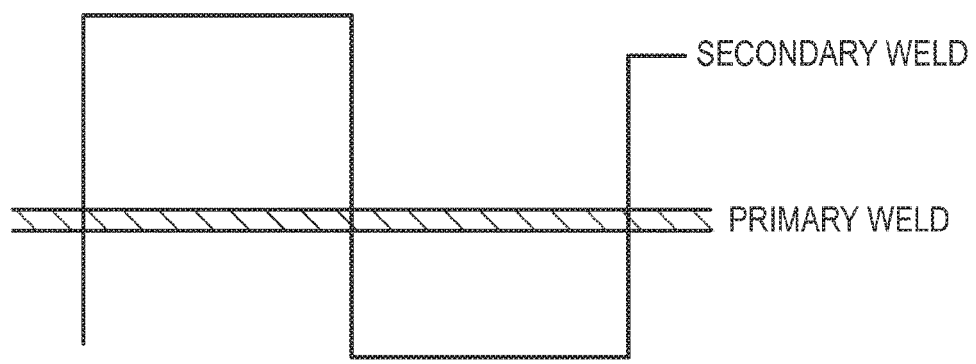

FIG. 5 shows another view of a compressor structure 10 of the type described above with reference to FIG. 1, in the area of an engine mount support structure. Here a first component 62 and a second component 64 joined by a weld line 66 are shown. The weld line 66 will be exposed to high loads during flight. The second component 64 comprises thrust lugs 22, as described above, forming part of the force path transmitting the thrust from the engine to the air craft body. The weld line 66 has been provided with a plurality of crack stoppers 68, 70. This figure also shows an example of different shapes of crack stoppers 68, 70 arranged along a weld line 66. In FIG. 5, four rectangular crack stoppers 68 are illustrated, oriented with their main axis 44 perpendicular to the weld line 66. A crack stopper 70 is illustrated as having elliptical shape, oriented with its main axis 44 along the weld line 66.

The compressor structure 10 illustrated in FIGS. 4 and 5 may be arranged in an aircraft engine, for example according to the illustration of FIG. 1.

The crack stoppers described herein can be applied either during manufacturing of the engine components, but also on already existing engine components.

It is not excluded from the present method that material is removed at the location of the crack stopper before adding material to produce the crack stopper. However, the method is simplified if merely adding material on top of the earlier made weld line, without removing any material underneath. A method which does not initially remove material is hence preferred at present time.

The method described herein is not limited to components for the type of aircraft engine illustrated in FIG. 1, but can be used for applications also in other types of aircraft engines. Further, it is not limited to the field of aircraft engines, but can be used also for any type of application requiring high strength welds with limitation of crack propagation.

Further modifications of the welding method and products and components resulting from application of the welding method within the scope of the claims will be apparent to the skilled person.

The invention claimed is:

1. A method of manufacturing a component of an aero-engine, the method comprising:
   determining an acceptable crack length for a weld line according to expected load cycles of the aero-engine;

forming the weld line joining two structural elements; and adding material across the weld line, thereby forming two or more crack stoppers for limiting crack propagation along the weld line;

wherein each of the two or more crack stoppers has a limited extension along the weld line as seen in relation to a length of the weld line, and wherein the weld line and the crack stopper are formed of the same material as the two structural elements, and wherein the two or more crack stoppers are formed along the weld line at predetermined distances from each other, the predetermined distances no greater than the determined acceptable crack length.

2. The method of claim 1, wherein the limited extension of each of the two or more crack stoppers is of a same order of magnitude as one of (i) a width of the weld line and (ii) the width of the weld line plus the heat effected zone.

3. The method of claim 1, wherein the two or more crack stoppers include a plurality of crack stoppers positioned along the weld line, and wherein the sum of the limited extension for all crack stoppers is less than 25% of the length of the weld line.

4. The method of claim 1, wherein each of the two or more crack stoppers spans across one of (i) the weld line and (ii) the weld line and to one or more features located on either or both of the two structural elements; and the face of each of the one or more crack stoppers facing the structural elements and the weld line is substantially completely attached to the weld line.

5. The method of claim 1, wherein each of the two or more crack stoppers is formed by metal deposition (MD).

6. The method of claim 1, wherein each of the two or more crack stoppers has an elongated shape extending in a direction of a main axis that is oriented one of perpendicularly to the weld line, at an oblique angle to the weld line, and extending along the weld line.

7. The method of claim 1, wherein each of the two or more crack stoppers has one of a substantially circular shape and a substantially polygonal shape.

8. The method of claim 1, wherein at least one crack stopper of the two or more crack stoppers has a height in a direction normal to the weld line, wherein the height is within a range of 0.5 to 10 times of a thickness of the structural elements.

9. The method of claim 1, further comprising, before adding material across the weld line, forming the weld line joining the two structural elements.

10. The method of claim 1, further comprising allowing the weld line to cool from a temperature obtained during the forming of the weld line before forming the two or more crack stoppers.

11. A method of welding two sub-components of an aero-engine together, comprising:

determining an acceptable crack length for a primary weld according to expected load cycles of the aero-engine;

joining the two sub-components together by the primary weld; and applying a plurality of secondary welds, said plurality of secondary welds extending across the primary weld, wherein the primary weld and the plurality of secondary welds are formed of the same material as the two sub-components, and wherein the plurality of secondary welds are applied at intervals along the primary weld, the intervals being no greater than the determined acceptable crack length.

12. The method of claim 11, wherein the at least one secondary weld intersects the primary weld at substantially 90 degrees to the primary weld.

13. The method of claim 11, wherein the secondary welds are uniformly spaced along the length of the primary weld.

14. The method of claim 1, wherein the weld line is formed after the acceptable crack length of the weld line is determined.

15. The method of claim 14, wherein the crack stoppers are formed prior to formation of any cracks in the weld line.

* * * * *